United States Patent [19]

Hirashima et al.

[11] Patent Number: 4,957,991
[45] Date of Patent: Sep. 18, 1990

[54] CHLOROPRENE POLYETHER (METH)ACRYLATE COPOLYMER AND PROCESS FOR PRODUCING SAME

[75] Inventors: Nobuhiro Hirashima; Shiro Matsunaga; Mitsuyuki Nakata, all of Niigata, Japan

[73] Assignee: Denki Kagaku Kogyo KK, Tokyo, Japan

[21] Appl. No.: 936,382

[22] Filed: Dec. 1, 1986

Related U.S. Application Data

[63] Continuation of Ser. No. 709,101, Mar. 7, 1985, abandoned.

[30] Foreign Application Priority Data

Mar. 13, 1984 [JP] Japan .................................. 59-47935

[51] Int. Cl.$^5$ .......................................... C08F 236/18
[52] U.S. Cl. .................................................. 526/295
[58] Field of Search ................................ 526/295, 213

[56] References Cited

U.S. PATENT DOCUMENTS

| | | | |
|---|---|---|---|
| 3,431,227 | 3/1969 | Kastning | 526/320 |
| 3,714,296 | 1/1973 | Kitagawa et al. | |
| 3,849,519 | 11/1974 | Kadowaki et al. | |
| 3,876,732 | 4/1975 | Kitagawa et al. | |
| 3,933,754 | 1/1976 | Kitagawa | 526/295 |
| 4,054,731 | 10/1977 | Marubashi | 526/295 |
| 4,146,592 | 3/1979 | Kitagawa et al. | |
| 4,234,704 | 11/1980 | Sakanaka | 526/295 |

FOREIGN PATENT DOCUMENTS

1568661 3/1969 France .

Primary Examiner—Christopher Henderson
Attorney, Agent, or Firm—Wegner & Bretschneider

[57] ABSTRACT

A chloroprene copolymer produced by radical copolymerization of 50 to 95% of chloroprene, 5 to 50% of at least one polyether (meth)acrylate of a specific formula, and 0 to 10% of any monomer copolymerizable with chloroprene, these percentages being by weight and based on the total quantity of monomers copolymerized, exhibits a remarkable combination of excellent oil resistance, weathering resistance, heat resistance, and coldness resistance. It was found that even when a polyether molecular chain has poor compatibility with chloroprene rubber, if this chain has an acryloyl or a methacryloyl group at one or both ends thereof, it can be copolymerized with chloroprene, and the resulting chloroprene copolymer processes and above mentioned combination of excellent properties.

2 Claims, No Drawings

CHLOROPRENE POLYETHER (METH)ACRYLATE COPOLYMER AND PROCESS FOR PRODUCING SAME

This application is a continuation of Ser. No. 709,101, filed Mar. 7, 1985, now abandoned.

BACKGROUND OF THE INVENTION

The present invention relates to a chloroprene copolymer having remarkably improved resistance to oils, weathering, heat and freezing and to a process for producing the same.

Chloroprene rubber comprising a homopolymer or copolymer of chloroprene, i.e., 2-chloro-1,3-butadiene, has been used as an elastomer having most balanced physical properties in various applications.

However, the fact that the chloroprene rubber has well balanced physical properties means that each of the physical properties reaches the standard level but does not always mean that the individual physical properties are particularly excellent. Therefore, the chloroprene rubber is inferior to butadiene-acrylonitrile copolymer rubber in oil resistance, to ethylene-propylene copolymer rubber in weathering resistance, to chlorosulfonated polyethylene in heat resistance, and to natural rubber and polybutadiene rubber in coldness resistance.

For these reasons, in specific fields, chloroprene rubber cannot be used or it is giving way to other types of rubbers under the present circumstances.

On the other hand, improvements are being rapidly made on polychloroprene itself. For example, there are known DCR-50 as oil resistant polychloroprene, manufactured by Denki Kagaku Kōgyō Kabushiki Kaisha, and DCR-34 as heat resistant polychloroprene, manufactured by Denki Kagaku K',ovs/o/ gyō Kabushiki Kaisha. Although there are proposed various chloroprenes in which a single property is improved as mentioned above, no chloroprene of the type in which all or most of the properties are improved has been developed. Moreover, improving one of the properties of the chloroprene often leads to a deterioration of the other properties. For example, the low temperature brittle points of the above-mentioned DCR-50 and DCR-34 are rather higher than that of conventional polychloroprene.

SUMMARY OF THE INVENTION

In view of these circumstances, we carried out a study of the problem and, as a result, have discovered that a chloroprene copolymer obtained by radical copolymerizing 50 to 95% of chloroprene, 5 to 50% of at least one polyether (meth)acrylate represented by the formula (I) given below, and 0 to 10% of a monomer copolymerizable with chloroprene, these percentages being by weight and being based on the total amount of the monomers to be copolymerized, exhibits a remarkably improved oil resistance, weathering resistance, heat resistance and coldness resistance. The present invention is based on this finding. By the term "(meth)acrylate" used herein is meant either an acrylate or methacrylate.

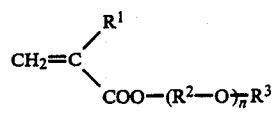

wherein: $R^1$ represents a hydrogen atom or a methyl group; $R^2$ represents a straight or branched alkylene group having an average number of carbon atoms of 2.5 to 6, a plurality of $R^2$s being the same or not the same; n represents a number of 4 to 20; and $R^3$ represents a hydrogen atom, an alkyl group having 1 to 3 carbon atoms, or a group of the formula:

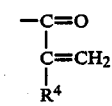

in which $R^4$ is a hydrogen atom or methyl group.

That is, a feature or the present invention resides in the fact that the above described problems encountered in the conventional chloroprene rubbers are successfully overcome by combining a polyether chain with the chloroprene polymer chain.

A polyether chain is a molecular chain having excellent oil resistance, coldness resistance, weathering resistance and other desirable characteristics. However, the compatibility of the polyether chain with chloroprene rubber is poor. Accordingly, for example, when chloroprene rubber and polypropylene glycol are kneaded in a rubber kneader and vulcanized, no increase in physical property of the chloroprene is observed and, moreover, the strength of the vulcanizate is extremely inferior. Furthermore, a phenomenon of the incorporated polypropylene glycol bleeding on the surface of the vulcanizate occurs.

The present invention was developed on the basis of the unexpected discovery that even when a polyether molecular chain has poor compatibility with chloroprene rubber, if the polyether molecular chain has an acryloyl or methacryloyl group at one or both ends thereof, such a polyether molecular chain can be incorporated in the chloroprene, and the resultant chloroprene copolymer is remarkably improved in oil resistance, weathering resistance, heat resistance and coldness resistance as compared with the conventional chloroprene rubbers

DETAILED DESCRIPTION OF THE INVENTION

The structural units of the chloroprene copolymer obtained according to the present invention are as follows, and the copolymer of the present invention is comprised of the units (A), (B) and/or (C) and the optional unit (D).

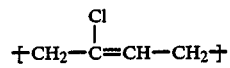

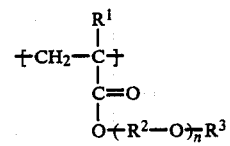

-continued

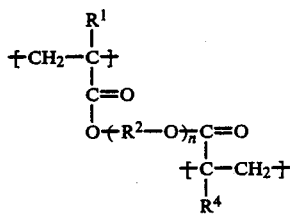
(C)

$$+X+ \quad (D)$$

wherein the symbols have the following meanings:

$R^1$ and $R^4$ each represent, independently, a hydrogen atom or a methyl group;

$R^2$ represents a straight or branched chain alkylene group having an average number of carbon atoms of 2.5 to 6 (a plurality of $R^2$s may or may not be the same);

n represents a number of 4 to 20;

$R^3$ represents a hydrogen atom, an alkyl group having 1 to 3 carbon atoms, or a group of the formula:

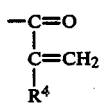

in which $R^4$ is a hydrogen atom or a methyl group; and

X represents a monomer unit copolymerizable with chloroprene and includes a chloroprene unit derived from the 1,2- or 3,4- addition of chloroprene.

The chloroprene copolymer containing the unit (C) according to the present invention is obtained when the polyether (meth)acrylate is a di(meth)acrylate and the second (meth)acryloyl groups of the di(meth)acrylate have taken part in the copolymerization. Even if the polyether (meth)acrylate is a di(meth)acrylate, at least a part of the second (meth)acryloyl groups thereof sometimes may not take part in the copolymerization. This is the reason why the chloroprene copolymer according to the present invention is defined to comprise the unit (B) "and/or" (C).

The chloroprene copolymer according to the present invention can be prepared by free-radical polymerization of monomers capable of providing the above described monomer units (A) through (D). The free-radical polymerization can be carried out by means of solution polymerization, bulk polymerization, suspension polymerization, emulsion polymerization or other polymerization methods. Emulsion polymerization using an aqueous medium is advantageous for industrial purposes. In the case of emulsion polymerization, the emulsifier used is preferably comprised mainly of a metal salt of disproportionated rosin acid in view of the stability and processing workability of the resulting crude rubber of chloroprene copolymer.

A dry polymer from the latex obtained by the emulsion polymerization can be recovered by a method conventionally used for the recovery of dry rubber from a natural or synthetic rubber latex, or any method usable for such a purpose. One such method comprises freezing the latex to provide a sheet-like article, washing the sheet with water, and blowing hot air onto the sheet to dry it. This method comprising drying of the freezed sheet generally produces favourable results. In the case where the freezing is unsatisfactory or incomplete, the sheet may be partially revived into the latex during the water washing step, whereby the yield is reduced.

Furthermore, in the case where monomers providing the monomer units (B) and/or (C), i.e., polyether (meth)acrylate, have a recurring number n of ether unit in the vicinity of the lower limit of the range of 4 to 20, which is within the scope of the present invention, e.g., a recurring number n of 4 to about 10, or the rate of polymerization of the emulsion polymerization is more than 90 to 95%, or $R^3$ in the above given formula (I) is a (meth)acryloyl group, the strength of the vulcanizate may in some cases be reduced, although the object of obtaining improved oil resistance, weathering resistance, heat resistance and coldness resistance according to the present invention is not obstructed. In such a case, the above-mentioned problems can be solved by mixing a latex of benzene-soluble polychloroprene into the latex of the present invention and by applying a polymer recovery method including the above mentioned drying of the freezed sheet to the resultant latex mixture. In this case, a suitable amount of the latex of benzenesoluble polychloroprene to be mixed is up to 9 times that of the latex of the present invention on the basis of the weight of the polymer. Throughout this specification, quantities expressed by "part" and percent (%) are by weight.

In accordance with the present invention, the chloroprene monomer is used in an amount of 50 to 95% in the polymerization step for the production of the polychloroprene. If the amount of the chloroprene monomer is less than 50%, the resultant polymer will no longer have the characteristics of a chloroprene polymer and cannot be subjected to conventional processing and formulation for chloroprenes. If the amount of the chloroprene monomer is more than 95%, the modifying effects of the polyether (meth)acrylate will not be satisfactory. The polyether (meth)acrylate is used in an amount of 5 to 50%. If the amount of the polyether (meth)acrylate is less than 5%, the modifying effects will not be satisfactory. If the amount of the polyether (meth)acrylate is more than 50%, the resultant polymer will no longer have the characteristics of a polychloroprene.

The structure of the polyether (meth)acrylate is defined as indicated in the above given formula (I). $R^2$ is an alkylene group of a straight or branched structure having an average number of carbon atoms of 2.5 to 6. When the average number of carbon atoms is less than 2.5, the resultant polymer exhibits an improved oil resistance and weathering resistance but not a satisfactorily improved coldness resistance. When the average number of carbon atoms is more than 6, the resultant polymer does not exhibit a satisfactorily improved oil resistance. The recurring number n of the polyether unit is limited to the range of 4 to 20. If the recurring number is less than 4, satisfactory modifying effects may not be obtained. A recurring number exceeding 20 results in a reduction in the strength of the vulcanizate. $R^3$ is a hydrogen atom, an alkyl group having 1 to 3 carbon atoms or a group of the formula:

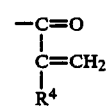

in which $R^4$ is a hydrogen atom or methyl group. The polyether (meth)acrylates may also be added to the polymerization system in the form of a mixture of one or more thereof without any limitation as long as the conditions of the above mentioned structure and total percentage by weight are satisfied.

A number of polyether (meth)acrylates are marketed. These polyether (meth)acrylates can be synthesized with relative ease. The synthesis methods include, for example, esterification of a polyether polyol, such as polypropylene glycol or polytetramethylene glycol, with (meth)acrylic acid, and addition polymerization of a (meth)acrylic ester containing a hydroxyl group in the alcohol residue, such as 2-ethylhydroxyl-(meth)acrylate, with propylene oxide, tetrahydrofuran or the like.

The comonomer other than polyether (meth)acrylates undergoes no limitation as long as the amount thereof is in the range of from 0 to 10%. The comonomers which can be used include, for example, a unit derived from the 1,2- or 3,4- addition of chloroprene, 2,3-dichlorobutadiene, 1-chlorobutadiene, butadiene, isoprene, styrene, methyl methacrylate, methyl acrylate, methacrylic acid, acrylonitrile and sulfur. The reason why the other comonomer should not exceed 10% is that such a large amount hinders the leveling-up of each characteristic of chloroprene, which is the essence of the present invention.

The chloroprene copolymer according to the present invention has remarkably improved physical properties with regard to resistances to oil, weathering, heat and coldness. Furthermore, the chloroprene copolymer of the present invention can be subjected to formulation, vulcanization, molding and other processings according to any methods conventionally used for processing chloroprene. Therefore, the chloroprene copolymer of the present invention can be used in the fields of application where conventional chloroprene elastomers could not and cannot be used because of their unsatisfactory physical properties.

For better understanding of the present invention, examples of the present invention and comparative examples are given hereunder.

The polyether di(meth) acrylates used in each example are indicated by symbols which indicate the following meanings.

a. Polypropylene glycol dimethacrylate

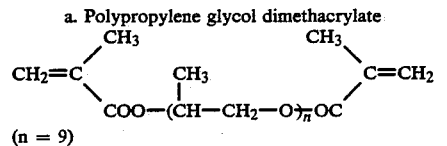

(n = 9)

b. Polytetramethylene glycol diacrylate

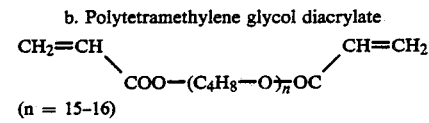

(n = 15–16)

c. Polyethylene glycol diacrylate

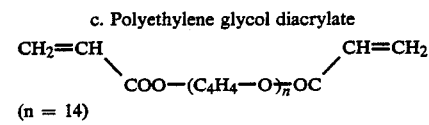

(n = 14)

d. Tripropylene glycol diacrylate

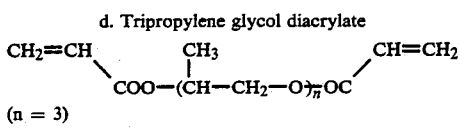

(n = 3)

-continued e. Polypropylene glycol monomethacrylate

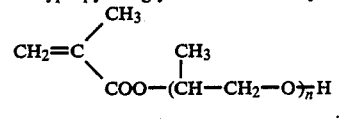

(n = 5–6)

f. Poly-(propylene glycol)-(ethylene glycol)monomethacrylate

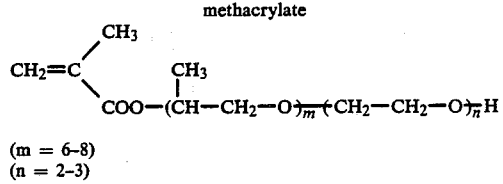

(m = 6–8)
(n = 2–3)

g. Polyethylene glycol monomethacrylate

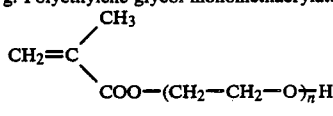

(n = 13–14)

The polymerization was carried out according to the following procedures.

The polymerization was carried out in a polymerization vessel made of stainless steel and having an internal capacity of 30 liters. That is, the polymerization vessel was charged, in a stream of nitrogen, with 200 parts of water, 5 parts of disproportionated rosin acid as an emulsifier, 3 parts of sodium dodecylbenzene sulfonate, 1.5 parts of the sodium salt of a formaldehyde-naphthalenesulfonic acid condensate as a dispersing agent, and 0.8 part of sodium hydroxide as another polymerization aid. Thereafter, the monomer mixture indicated in Table 1 was added to the polymerization vessel together with n-dodecyl mercaptan.

The polymerization was carried out under the conditions described in Table 1 by using formamidine sulfinic acid as a radical polymerization initiator. Thiodiphenylamine was added to the polymerizer at the time an arbitrary rate of polymerization of the chloroprene monomer was reached so as to stop the polymerization. The unreacted chloroprene monomer and a specific amount of water were removed from the reaction mixture by steam stripping to obtain a latex having a solid content of 30%.

The latex of polychloroprene copolymerized with the polyether (meth)acrylate was, if necessary, mixed with a latex of benzene-soluble polychloroprene according to the content indicated in Table 2. A dry polymer was isolated from the resultant latex according to a conventional freeze-coagulating method. The physical properties of the polymer are shown in Table 2.

The polymer was vulcanized under the following formulation and conditions. The physical properties of the vulcanizate was determined.

(a) Formulation

| Polymer | 100 (parts) |
|---|---|
| Phenyl α-naphthylamine | 1 |
| Magnesia | 4 |
| Zinc white (or zinc oxide) | 5 |
| 2-Mercaptoimidazoline | 0.35 |

(b) Condition

Press vulcanization at 150° C. for 15 minutes.

In Table 2, the polymer Nos. 1 through 9 are examples of the present invention, and the polymers Nos. 9 through 19 are comparative examples.

TABLE 1

| Item | Latex I | II | III | IV | V | VI | VII |
|---|---|---|---|---|---|---|---|
| Polymerization Condition | | | | | | | |
| Type of polyether (meth)acrylate | a | a | b | e | f | f | a |
| Charge of polyether (meth)acrylate (part) | 10 | 30 | 10 | 15 | 15 | 35 | 2 |
| Charge of chloroprene monomer (part) | 90 | 70 | 85 | 85 | 80 | 60 | 98 |
| Charge of 2,3-dichloro-butadiene (part) | 0 | 0 | 5 | 0 | 5 | 5 | 0 |
| Charge of n-dodecyl mercaptan (part) | 0.25 | 0.10 | 0.30 | 0.10 | 0.12 | 0.08 | 0.12 |
| Polymerization temperature (°C.) | 40 | 40 | 45 | 40 | 45 | 25 | 40 |
| Polymerization time (minute) | 290 | 250 | 280 | 260 | 270 | 300 | 220 |
| Polymerization Result | | | | | | | |
| Rate of polymerization of chloroprene monomer (%) | 95 | 92 | 95 | 75 | 78 | 80 | 70 |
| Mooney viscosity ($ML_{1+4}$ determined at 100° C.) | 118 | 96 | 78 | 80 | 70 | 63 | 98 |

| Item | Latex VIII | IX | X | XI | XII | XIII | XIV |
|---|---|---|---|---|---|---|---|
| Polymerization Condition | | | | | | | |
| Type of polyether (meth)acrylate | a | c | d | g | a | — | — |
| Charge of polyether (meth)acrylate (part) | 55 | 15 | 10 | 15 | 10 | 0 | 0 |
| Charge of chloroprene monomer (part) | 45 | 80 | 85 | 85 | 75 | 100 | 94 |
| Charge of 2,3-dichloro-butadiene (part) | 0 | 5 | 5 | 0 | 15 | 0 | 6 |
| Charge of n-dodecyl mercaptan (part) | 0.15 | 0.30 | 0.30 | 0.12 | 0.25 | 0.19 | 0.23 |
| Polymerization temperature (°C.) | 40 | 40 | 40 | 40 | 40 | 40 | 45 |
| Polymerization time (minute) | 290 | 250 | 210 | 250 | 250 | 240 | 230 |
| Polymerization Result | | | | | | | |
| Rate of polymerization of chloroprene monomer (%) | 92 | 95 | 95 | 78 | 90 | 70 | 70 |
| Mooney viscosity ($ML_{1+4}$ determined at 100° C.) | 48 | 85 | 102 | 61 | 125 | 72 | 52 |

TABLE 2(a)

| Item | Polymer 1 | 2 | 3 | 4 | 5 | 6 | 7 | 8 | 9 | 10 |
|---|---|---|---|---|---|---|---|---|---|---|
| Recipe of latex blend | | | | | | | | | | |
| Type of polyether (meth)acrylate-copolymerized latex/No. | I | II | III | IV | V | VI | I | III | V | VII |
| Formulation (part) | 70 | 50 | 60 | 80 | 50 | 40 | 100 | 80 | 100 | 60 |
| Type of benzene-soluble polychloroprene latex/No. | XIII | XIII | XIII | XIII | XIII | XIII | — | XIV | — | XIII |
| Formulation (part) | 30 | 50 | 40 | 20 | 50 | 60 | 0 | 20 | 0 | 40 |
| Mooney viscosity ($ML_{1+4}$, 100° C.) | 98 | 82 | 73 | 75 | 70 | 65 | 118 | 65 | 70 | 85 |
| Ordinary state properties | | | | | | | | | | |
| 500% modulus (Kg/cm²) | 22 | 21 | 22 | 19 | 22 | 19 | 23 | 22 | 21 | 24 |
| Tensile strength (Kg/cm²) | 175 | 185 | 190 | 175 | 192 | 172 | 142 | 159 | 201 | 202 |
| Elongation at break (%) | 920 | 940 | 925 | 940 | 945 | 950 | 890 | 900 | 960 | 960 |
| Coldness resistance* | | | | | | | | | | |
| Brittle point (°C.) | −43 | −45 | −43 | −43 | −42 | −43 | −44 | −44 | −44 | −39 |
| Heat resistance** | | | | | | | | | | |
| Retention of tensile strength (%) | 74 | 75 | 82 | 72 | 84 | 85 | 86 | 82 | 88 | 72 |
| Retention of elongation (%) | 86 | 88 | 90 | 83 | 91 | 92 | 90 | 89 | 94 | 38 |
| Oil resistance*** | | | | | | | | | | |
| Retention of tensile strength (%) | 60 | 63 | 58 | 58 | 65 | 68 | 71 | 69 | 70 | 32 |
| Retention of elongation (%) | 75 | 78 | 70 | 69 | 75 | 70 | 78 | 78 | 79 | 43 |
| Increase in volume (%) | 89 | 82 | 95 | 98 | 86 | 84 | 78 | 80 | 82 | 125 |
| Weathering resistance**** | | | | | | | | | | |
| Time till crack initiation (Hr.) | 180 | 210 | 185 | 205 | 215 | 225 | 220 | 205 | 220 | 95 |

TABLE 2(b)

| Item | Polymer 11 | 12 | 13 | 14 | 15 | 16 | 17 | 18 | 19 |
|---|---|---|---|---|---|---|---|---|---|
| Recipe of latex blend | | | | | | | | | |
| Type of polyether (meth)acrylate-copolymerized latex/No. | VIII | IX | X | XI | XII | I | III | — | — |
| Formulation (part) | 60 | 100 | 50 | 60 | 60 | 5 | 7 | 0 | 0 |
| Type of benzene-soluble polychloroprene latex/No. | XIII | — | XIII | XIV | XIV | XIII | XIV | XIII | XIV |
| Formulation (part) | 40 | 0 | 50 | 40 | 40 | 95 | 93 | 100 | 100 |
| Mooney viscosity ($ML_{1+4}$, 100° C.) | 49 | 85 | 98 | 55 | 83 | 75 | 58 | 72 | 52 |
| Ordinary state properties | | | | | | | | | |
| 500% modulus (Kg/cm$^2$) | 16 | 21 | 20 | 23 | 21 | 24 | 22 | 24 | 23 |
| Tensile strength (Kg/cm$^2$) | 128 | 142 | 129 | 172 | 165 | 210 | 195 | 225 | 205 |
| Elongation at break (%) | 1280 | 875 | 880 | 920 | 890 | 980 | 920 | 1060 | 950 |
| Coldness resistance* | | | | | | | | | |
| Brittle point (°C.) | −46 | −39 | −38 | −36 | −36 | −39 | −37 | −39 | −36 |
| Heat resistance** | | | | | | | | | |
| Retention of tensile strength (%) | | 78 | 86 | 83 | 78 | 75 | 76 | 72 | 74 |
| Retention of elongation (%) | | 86 | 52 | 87 | 88 | 63 | 62 | 54 | 62 |
| Oil resistance*** | | | | | | | | | |
| Retention of tensile strength (%) | | 72 | 70 | 64 | 68 | 34 | 45 | 29 | 35 |
| Retention of elongation (%) | | 81 | 78 | 72 | 72 | 50 | 61 | 45 | 52 |
| Increase in volume (%) | | 80 | 84 | 88 | 85 | 125 | 118 | 135 | 132 |
| Weathering resistance***** | | | | | | | | | |
| Time till crack initiation (Hr.) | | 195 | 198 | 160 | 190 | 95 | 105 | 75 | 80 |

*The vulcanizate sheet was cut into test pieces each of 32 mm length, 6.3 mm width, and 2 mm thickness, and the embrittlement point of each piece was determined by means of an impact embrittlement testing machine.
**The determination was carried out by allowing the vulcanizate sheet to stand in a gear type aging testing machine at 120° C. for 4 days.
***The determination was carried out by immersing the vulcanizate sheet in ASTM No. 3 oil at 100° C. for 96 hours.
****The time required for cracks to be generated in the vulcanizate sheet in a 20% stretched state under the conditions of an ozone concentration of 50 pphm and a temperature of 50° C., was determined.
Note:
Since the vulcanizate sheet No. 11 had a tacky surface and was not vulcanized to a satisfactory degree, only the ordinary state properties and brittle point were determined.

We claim:

1. A chloroprene copolymer prepared by free-radical copolymerization of 50 to 95% by weight of chloroprene, 5 to 50% by weight of a polyether dimethacrylate represented by the following formula, and 0 to 10% by weight of a monomer copolymerizable with chloroprene, these percentages being based on the total amount of the monomers:

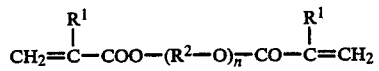

wherein: $R^1$ represents a hydrogen atom or methyl group; n is an integer of 5 to 20; and $R^2$ represents a straight or branched chain alkylene group having an average number of carbon atoms of 3 to 6, a plurality of $R^2$s being the same or different.

2. A chloroprene copolymer as claimed in claim 1, wherein $R^2$ is selected from the group consisting of polypropyleneglycol, polybutylene glycol and copolyethyleneglycol having an ethyleneglycol moiety content such that the average number of the carbon atoms of the copolyethyleneglycol is 3 to 6.

* * * * *